(12) United States Patent
Holmes et al.

(10) Patent No.: US 8,979,694 B2
(45) Date of Patent: Mar. 17, 2015

(54) HYBRID VEHICLE WITH POWER-SPLIT AND PARALLEL HYBRID TRANSMISSION AND METHOD OF CONTROLLING SAME

(71) Applicant: GM Global Technology Operations LLC, Detroit, MI (US)

(72) Inventors: Alan G. Holmes, Clarkston, MI (US); Min-Joong Kim, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 13/773,998

(22) Filed: Feb. 22, 2013

(65) Prior Publication Data

US 2014/0243149 A1     Aug. 28, 2014

(51) Int. Cl.
*B60W 20/00*     (2006.01)

(52) U.S. Cl.
CPC ............... *B60W 20/40* (2013.01); *B60W 20/30* (2013.01); *Y02T 10/6234* (2013.01); *Y02T 10/6265* (2013.01); *Y02T 10/92* (2013.01); *Y10S 903/902* (2013.01); *Y10T 477/26* (2015.01); *Y10S 903/916* (2013.01)
USPC ................... 475/5; 903/916; 903/902

(58) Field of Classification Search
USPC .............................................. 475/5; 903/916
See application file for complete search history.

(56) References Cited

U.S. PATENT DOCUMENTS

| | | | |
|---|---|---|---|
| 6,691,809 B2 * | 2/2004 | Hata et al. | 180/65.225 |
| 7,416,501 B2 | 8/2008 | Holmes et al. | |
| 8,083,016 B2 | 12/2011 | Naik et al. | |
| 2011/0143874 A1 * | 6/2011 | Tangl | 475/5 |

OTHER PUBLICATIONS

Hidehiro Oba, Akihiro Yamanaka, Hiroshi Katsuta, Kensuke Kamichi, "Development of a Hybrid Powertrain System Using CVT in a Minivan", SAE Technical Paper Series, Mar. 2002, 2002-01-0991.

* cited by examiner

*Primary Examiner* — Sherry Estremsky
(74) *Attorney, Agent, or Firm* — Quinn Law Group, PLLC

(57) ABSTRACT

A hybrid vehicle has a powertrain that includes a transmission with a planetary gear set that has a first, a second, and a third member. An engine is connected for unitary rotation with the first member. A first final drive is operatively connectable with the carrier member and connected with the first axle. A first motor-generator is connected for unitary rotation with the third member. A second motor-generator is operatively connected for proportional rotation with one of the axles. A first clutch is selectively engageable to connect any two of the members for unitary rotation with one another. The planetary gear set provides an underdrive ratio of speed of the second member to speed of the engine when the sun gear member is stationary.

18 Claims, 3 Drawing Sheets

HYBRID VEHICLE WITH POWER-SPLIT AND PARALLEL HYBRID TRANSMISSION AND METHOD OF CONTROLLING SAME

TECHNICAL FIELD

The present teachings relate to a vehicle with a hybrid transmission and a method of controlling the same.

BACKGROUND

A vehicle may be equipped with one or more front wheels and one or more rear wheels. The vehicle may be equipped with an engine, producing shaft power to propel the vehicle. The vehicle may be equipped with a transmission for transforming shaft power from the output of an engine at relatively low torque and high speed into relatively high torque and low speed to drive one or more wheels. The vehicle may be equipped with axles for conveying shaft power from the transmission to one or more wheels. It may be advantageous, especially regarding mechanical simplicity, to drive only the front wheels or only the rear wheels using the engine, transmission, and axles. It may be advantageous, especially regarding operation in a variety of environmental conditions, to drive all of the wheels.

The force to propel a wheeled vehicle traveling at a steady speed across a level surface with no substantial wind may be represented mathematically using three terms related to the speed of the vehicle, commonly referred to as F0, F1 and F2. The force may be approximately the sum of the F0 term, the F1 term multiplied by the speed of the vehicle, and the F2 term multiplied by the square of the speed of the vehicle. The F0 term is related to dry friction, the F1 term is related to viscous friction, and the F2 term is related to aerodynamic drag. These terms are theoretically all greater than zero, and when found empirically are generally calculated, based on measurements, to be greater than zero. Thus, the force to propel the vehicle at a steady speed on a level surface with no wind is approximated by a parabolic function of that speed. The rotational torque required to drive the vehicle by traction of one or more of its wheels is therefore approximated by a parabolic function of the rotational speed of the wheels of the vehicle.

An engine producing shaft power may be capable of output across a range of rotational output speeds and across a range of output torque while burning fuel at a rate which is a predictable function of speed and torque. For example, a contemporary internal combustion reciprocating-piston or rotary-piston engine may be capable of running with acceptable smoothness and producing some amount of shaft torque output above an idle speed and may be capable of running without damage and producing some amount of shaft torque output up to a maximum engine speed. The amount of shaft torque output from the example engine may vary from a maximum value with its throttle wide open to zero with its throttle shut at a particular speed. The maximum shaft torque, commonly referred to as "the torque curve", may be similar in magnitude, that is relatively "flat", across a speed range that is a part of the overall speed range from idle speed to maximum engine speed.

The amount of shaft work produced for a given amount of fuel consumed, that is the efficiency of the engine in converting the potential of the fuel into shaft work, varies with operating torque and speed. The efficiency for an engine using spark-ignition and following the four-stroke cycles attributed to Otto or Atkinson is generally greatest with the throttle wide open, that is at maximum torque, and decreases to zero efficiency at zero output torque, provided that the ratio of fuel and air remains substantially the same, e.g. balanced, for all operating conditions. Enrichment of the mixture with extra fuel generally allows operating with output torque beyond the maximum that can be obtained with a balanced or lean mixture, but the efficiency of the engine is lowered by the use of this extra fuel. For a vehicle where fuel efficiency and clean exhaust are paramount, the engine generally will be controlled to operate with a substantially balanced or slightly lean mixture, for all torque levels and for all speeds except the combination of high torque and high speed which allows the engine to produce its maximum power and the speeds and torques approaching this combination.

A spark-ignition engine may be operated with alternative means of controlling or changing the torque instead of a throttle, which likewise decreases engine efficiency, though in lesser magnitude, when torque is reduced below its maximum. For instance, the engine may have cylinders equipped with intake valves, and the duration or timing of the opening or closing of these valves, or the distance of the opening of these valves, commonly referred to as "lift", may be varied to control or to restrict the amount of air or a mixture of air and fuel, admitted to each cylinder. Changing the timing of the intake valves, so that they remain open and allow some air or air-fuel mixture to escape from each cylinder after the intake stroke, that is late intake valve closing, may result in less loss of efficiency, because the piston is not required to pull the air or air-fuel through a restriction during the intake stroke. In general, however, reducing the amount of air admitted to a cylinder below a particular level will reduce the net expansion of the gases and therefore significantly reduce the efficiency of the engine.

A compression-ignition engine is generally controlled simply by varying the amount of fuel introduced into its cylinders or other working chambers. The compression ratio is high enough and the fuel properties are such that combustion of fuel takes place around individual fuel droplets when they are introduced into the cylinder following most of the compression stroke. Maintaining a favorable mixture of fuel and air throughout the chamber to propagate a flame across the chamber from a spark source of combustion is not necessary. Therefore, air need not be restricted from entering the engine by a throttle or other means, expansion ratio is maintained, and efficiency is relatively flat across a wide range of torque values at any given speed. To change or to control the torque output of the compression-ignition engine, the amount of fuel introduced into the cylinders may be varied between zero and a predetermined maximum amount of fuel that can be burned without visible or otherwise excessive smoke or other unburned fuel in the exhaust.

A transmission is generally provided in a wheeled vehicle as part of the operative connection from the engine to the wheels. Contemporary vehicles often have a transmission, sometimes referred to as a "transaxle", which includes one or more devices for selecting from multiple speed and torque ratios from the engine to the wheels, final drive gearing with a fixed ratio of speed and torque, and an axle differential which is connected to left and right wheels by the two halves of an axle. Such a transmission is included in a vehicle to transform the speed and torque output from the output shaft of the engine to a lesser speed and greater torque that is more suitable for turning the axle and wheels and thereby driving the vehicle. The transmission typically provides between four and eight different selectable ratios, each of which is a ratio of both the speed of the engine over the speed of the input to the final drive and the torque of the input to the final drive over the torque of the engine, not considering the drag or inertia of the transmission components. The different selectable ratios of both speed and torque are included to allow the vehicle to accelerate across a wide range of speeds and to cruise at any speed within that range above some minimum cruising speed which is customarily one third or less of the maximum cruising speed.

SUMMARY

A hybrid vehicle has a first axle, a second axle, a powertrain that includes an engine and a transmission, a first motor-generator, and a second motor-generator. The first motor-generator is electrically connected to the second motor-generator through a power inverter that is also connected to an energy storage device.

The transmission includes a planetary gear set that has a first, a second, and a third member that include, in any order, a sun gear member, a ring gear member, and a carrier member that supports a plurality of pinion gears that mesh with the sun gear member and the ring gear member. The engine is connected for unitary rotation with the first member of the planetary gear set. The transmission also has a first final drive that has a first member operatively connectable to rotate in unison with the second member of the planetary gear set and a second member connected for unitary rotation with the first axle. The first motor-generator is connected for unitary rotation with the third member of the planetary gear set. A first clutch is selectively engageable to connect any two of the sun gear member, the carrier member, and the ring gear member for unitary rotation with one another. The planetary gear set provides an underdrive ratio of speed of the second member of the planetary gear set to speed of the engine when the first motor-generator and therefore the third member is not rotating. The second motor-generator is connectable for proportional rotation with one of the axles.

The hybrid vehicle has a first ratio of torque of the first axle to torque of the engine when the first clutch is not engaged, the first motor-generator is powered to apply torque on the third member of the planetary gear set, and the second motor-generator freewheels.

The hybrid vehicle has a second ratio of torque of the first axle to torque of the engine lower than the first ratio when the first clutch is engaged. The hybrid vehicle is thus operable in a hybrid power-split operating mode (i.e., an input-split operating mode) when the first clutch is not engaged and in a hybrid parallel operating mode when the first clutch is engaged.

With the hybrid vehicle configured as described, engaging the first clutch thus allows cruising at a speed ratio equal to the second ratio of torque, which is beyond the speed ratio of engine speed to wheel speed at which the first motor-generator would stop rotating (i.e., the mechanical point). Cruising at this speed ratio established by engagement of the first clutch is accomplished without the first motor-generator requiring battery power and without requiring power from the second motor-generator, which would resist rotation of the second axle and thus be "through the road power". Cruising at this speed ratio established by the engagement of the first clutch results in lower electrical losses than many single mode input-split hybrids that require circulating electrical power from the motor-generators when cruising. When cruising with the first clutch engaged, accelerating the vehicle will increase the engine speed in direct proportion to the increase in vehicle speed, providing a connected feel for the vehicle driver that is not achieved by a powertrain in which engine speed does not correlate with acceleration demanded by driver input.

In one embodiment, the second torque ratio is that at which the engine operates without throttling, without the torque from the engine exceeding a torque necessary to propel the vehicle at a steady speed, and with the second motor-generator freewheeling. The first ratio of torque, with the first clutch not engaged, is a greater ratio of torque of the first axle to torque of the engine than the second ratio of torque, with the clutch engaged. Thus, the hybrid parallel operating mode, with the clutch engaged, is efficient for steady state operation and the input-split operating mode, with the clutch not engaged, is suitable for acceleration of the vehicle.

In some embodiments, the powertrain also includes an electric drive module including the second motor-generator. The electric drive module also includes a second final drive that has a first member operatively connected for unitary rotation with the second motor-generator and a second member driven by the first member and connected for unitary rotation with the second axle.

If a second clutch is provided that is selectively engageable to connect the second member of the planetary gear set for unitary rotation with the first member of the first final drive, that is, if the first final drive is selectively disconnectable from the planetary gear set, then a hybrid series operating mode can be achieved when the second clutch is not engaged. Additionally, the first motor-generator can be used to start the engine when the second clutch is not engaged. Electric-only operating modes can also be achieved. A controller is operatively connected to the motor-generators and the clutches, and carries out a stored algorithm to establish the various operating modes of the powertrain.

The above features and advantages and other features and advantages of the present invention are readily apparent from the following detailed description of the best modes for carrying out the invention when taken in connection with the accompanying drawings.

DETAILED DESCRIPTION

Figure 1:
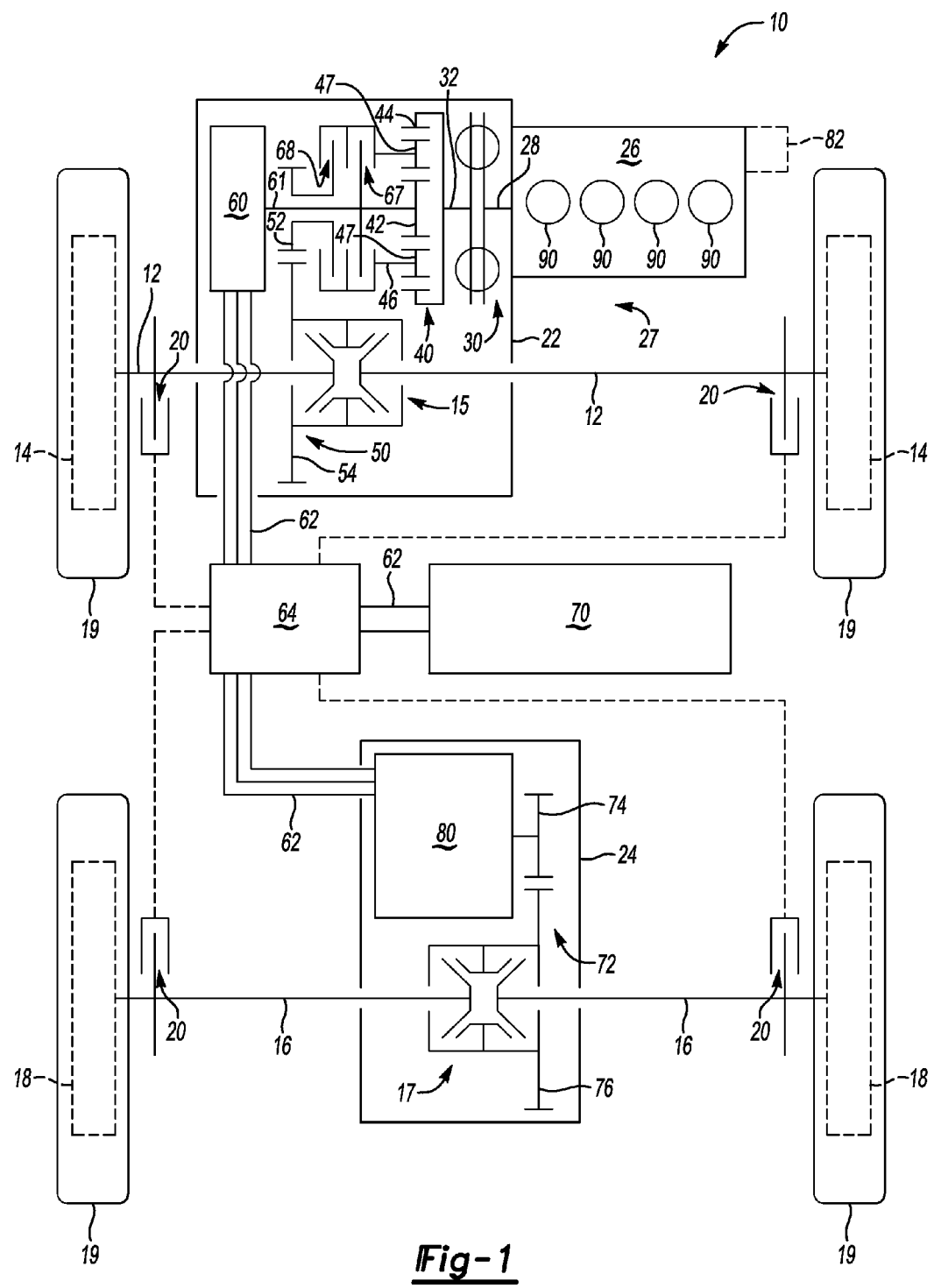
FIG. 1 is a schematic illustration of a vehicle having a hybrid electric powertrain connected to a first axle and a second axle, including an engine, a transmission, and a rear drive module.

Referring to the drawings, wherein like reference numbers refer to like components throughout the several views, FIG. 1 schematically depicts a hybrid electric vehicle 10 having a first axle 12 connected to a first pair of wheels 14, and a second axle 16 spaced longitudinally on the vehicle 10 from the first axle 12, and connected to a second pair of wheels 18. The first axle 12 and the second axle 16 are also referred to herein as drive axles. Although in the embodiment shown each axle 12, 16 is connected to a pair of wheels 14, 18, respectively for unitary rotation, in other embodiments, either one of the axles 12, 16 can be configured to drive only one wheel, such as if the vehicle 10 is configured with wheel motors, or is a three-wheeler. In one embodiment, the wheels 14 are front wheels, and the wheels 18 are rear wheels. In FIG.

1, the wheels 14, 18 are shown with tires 19 attached. Each axle 12, 16 has two separate axle portions connected via a respective differential 15, 17. The differential establishes that the speed of each axle 12, 16 is the average of the speeds of its two separate axle portions and that the torque of each axle 12, 15 is the sum of the torques of its two separate axle portions, as is readily understood by those skilled in the art. Each wheel 14, 18 has a friction brake mechanism 20, shown as a disc brake. The first axle 12 is connectable to a hybrid electric transmission 22, and the second axle 16 is connectable to an electric drive module 24. The hybrid electric transmission 22, an engine 26, an energy storage device 70, a controller 64, and the electric drive module 24 together establish a hybrid powertrain 27 that is configured to provide various operating modes for propulsion of the vehicle 10 without creating a drag torque on the second axle 16.

The hybrid electric transmission 22 is connected to the engine 26, which has an output shaft 28 and an engine vibration dampener 30. The transmission 22 includes an input shaft 32, a differential gear set that is a simple planetary gear set 40, a first final drive 50 that is a gear set, and the axle differential 15. The planetary gear set 40 includes a central sun gear member 42, a carrier member 46 that rotatably supports a plurality of pinion gears 47, and a ring gear member 44. In the embodiment shown, the ring gear member 44 is a first member, the carrier member 46 is a second member, and the sun gear member 42 is a third member of the planetary gear set 40. In the embodiment shown, each of the pinion gears 47 meshes with both the ring gear member 44 and the sun gear member 42. However, in other embodiments, a double-pinion planetary gear set can be used, with a first set of pinions that mesh with the ring gear member 44, and a second set of pinions that mesh with the first set of pinions and with the sun gear member 42. Either the single set of pinions 47 or a double set of pinions is referred to herein as a plurality of pinions. The first final drive 50 includes a first gear 52 and a second gear 54 that meshes with the first gear 52. The second gear 54 is connected for unitary rotation with a component of the differential 15, as is understood by those skilled in the art. The final drive 50 may instead be a chain engaged with rotating sprockets or a combination of mechanical elements instead of meshing gears.

The transmission 22 includes a first electric machine 60, referred to herein as a motor-generator 60, but that, in some embodiments, can be configured to be operable only as a generator, that is, is not configured to be operated as a motor. In other embodiments, the first electric machine 60 is operable as either a motor or as a generator, in different operating modes. The motor-generator 60 has cables 62 that electrically connect it to an electronic controller 64. The first electric motor-generator 60 includes a rotatable rotor and a stationary stator, arranged with an air gap between the stator and the rotor, as is known. However, for simplicity in the drawings, the first electric motor-generator 60 is represented as a simple box. The stator of the motor-generator 60 is connected via a shaft 61 to rotate in unison with the sun gear member 42. The controller 64 also includes an integrated rectifier to convert alternating current provided by the first motor-generator 60 to direct current that can be stored in an energy storage device 70, such as a propulsion battery, connected through cables 62 to the controller 64. In embodiments in which the motor-generator 60 is operable as a motor, the controller 64 also includes an integrated power inverter for converting direct current from the energy storage device 70 to alternating current for operating the first electric motor-generator 60. The rectifier or the power inverter could instead be a separate component from the controller 64.

The transmission 22 includes a first rotating clutch 67 that is selectively engageable by the controller 64 to connect the sun gear member 42 to rotate in unison with the carrier member 46 so that all members of the planetary gear set 40 rotate in unison. Clutch 67 is also referred to as a lock-up clutch. The transmission 22 further includes a second rotating clutch 68 that is selectively engageable by the controller 64 to couple the carrier member 46 for unitary rotation with the first gear 52 of the first final drive 50. As used herein, two components are connected for "common rotation", "unitary rotation", and "rotation in unison" when a mechanical connection requires that the components rotate at the same speed, including a speed of zero (i.e., when the components are held stationary). The clutch 68 is concentric with the input shaft 32, but is not connected for common rotation with the input shaft 32. That is the clutch 68 surrounds the input shaft 32 as a sleeve.

The electric drive module 24 includes a second final drive 72 that is a gear set having a first gear 74 and a second gear 76 that meshes with the first gear 74. The second gear 76 rotates commonly with one portion of the axle differential 17, as is understood by those skilled in the art. The final drive 72, instead of a pair of meshing gears, may be a chain engaged with rotating sprockets or a planetary gear set or a combination of mechanical elements.

The electric drive module 24 also includes a second electric machine 80, referred to herein as a second motor-generator 80, which can be operable as a motor to propel the hybrid electric vehicle 10 or as a generator to assist in its propulsion or to provide or to assist in braking. The second motor-generator 80 has cables 62 that electrically connect it to the controller 64. The second electric motor-generator 80 includes a rotatable rotor and a stationary stator, arranged with an air gap between the stator and the rotor, as is known. However, for simplicity in the drawings, the second electric motor-generator 80 is represented as a simple box. The controller 64 also includes an integrated power inverter to convert direct current from the energy storage device 70 to alternating current for operating the second electric motor-generator 80 and to convert alternating current from the motor-generator 80 to direct current that can be stored in an energy storage device 70.

The second axle 16, like the first axle 12, is actually composed of two shafts, generally referred to as half-shafts, which are connected to gears, such as bevel gears, within the respective axle differential 15, 17, as is understood by those skilled in the art. When travelling in a straight line, without wheel slip, the axle differential 15 and the two halves of the axle 12 all rotate as if they were a solid unit, as do the axle differential 17 and the two halves of the axle 16. The common speed of these rotating parts is referred to as the axle speed. When travelling around a curve or with wheel slip, the two halves of the axle 12 may be rotating at different speeds from one another. The portion of the differential 15 that is connected for common rotation with the second gear 54 of the final drive 50 rotates at an average of the speeds of the two halves of the axle 12, which is then called the axle speed. Similarly, if the two halves of the axle 16 are rotating at different speeds the average of the two speeds is referred to as the speed of the axle 16. Thus, although the differential 15 or 17 allows the axle portions 12 or 16 to rotate at different speeds under certain operating conditions, each axle portion remains connected for unitary rotation with the respective wheel 14 or 18 mounted thereon. Accordingly, as used herein, the axle 12 is considered connected for unitary rotation with the wheels 14 and the axle 16 is connected for unitary rotation with the wheels 18.

It should be appreciated that, although a single controller 64 is illustrated and described as being operatively connected to both of the motor-generators 60, 80, to the engine 26, and to the clutches 67, 68, multiple different controllers, all configured to communicate with one another, may be dedicated to one or more of these components. In some embodiments, controller 64 may include an integrated power inverter to supply each motor-generator 60, 80 with alternating current at a frequency corresponding to the operating speed of each motor-generator, as is known. Controller 64 may be used to receive electrical power from the first motor-generator 60 and to convey electrical power to the second motor-generator 80.

The planetary gear set 40 in the transmission 22 is used as a differential gear set. That is, each of the three coaxial rotating elements: the sun gear member 42, the carrier member 46, and the ring gear member 44, may be rotating simultaneously, so that the speed of the carrier member 46 is the weighted average of the speeds of the sun gear member 42 and ring gear member 44, weighted by the numbers of teeth on the sun gear member 42 and the ring gear member 44. In FIG. 1, the sun gear member 42 is connected for unitary rotation with the first motor-generator 60, the ring gear member 44 is connected for unitary rotation with the input shaft 32 and thus to the engine output shaft 28, and the carrier member 46 is connected to one side of the rotating clutch 68 and is thereby selectively connected for unitary rotation with the first gear 52 of the final drive 50 when the clutch 68 is engaged.

In the embodiment shown in FIG. 1, the engine 26 is an internal combustion type with cylinders 90 as working chambers of the engine. In this particular embodiment, the engine 26 has four cylinders 90 arranged along the crankshaft 28. As is known, valves may be used to admit air or an air-fuel mixture to each cylinder 90 and to exhaust combustion products from the cylinders 90 as part of exemplary engine operation in a four-stroke cycle of intake stroke, compression stroke, expansion stroke, and exhaust stroke. In some embodiments, the engine 26 may be equipped to selectively operate one or more cylinders 90, such as by selectively opening valves and admitting air or an air-fuel mixture to one or more cylinders 90 while air or combustion products remain trapped in the other cylinders 90 of the engine 26. This may be referred to as cylinder deactivation. The engine 26 may be either a spark-ignition engine or a compression-ignition (i.e., a diesel) engine.

Figure 2:
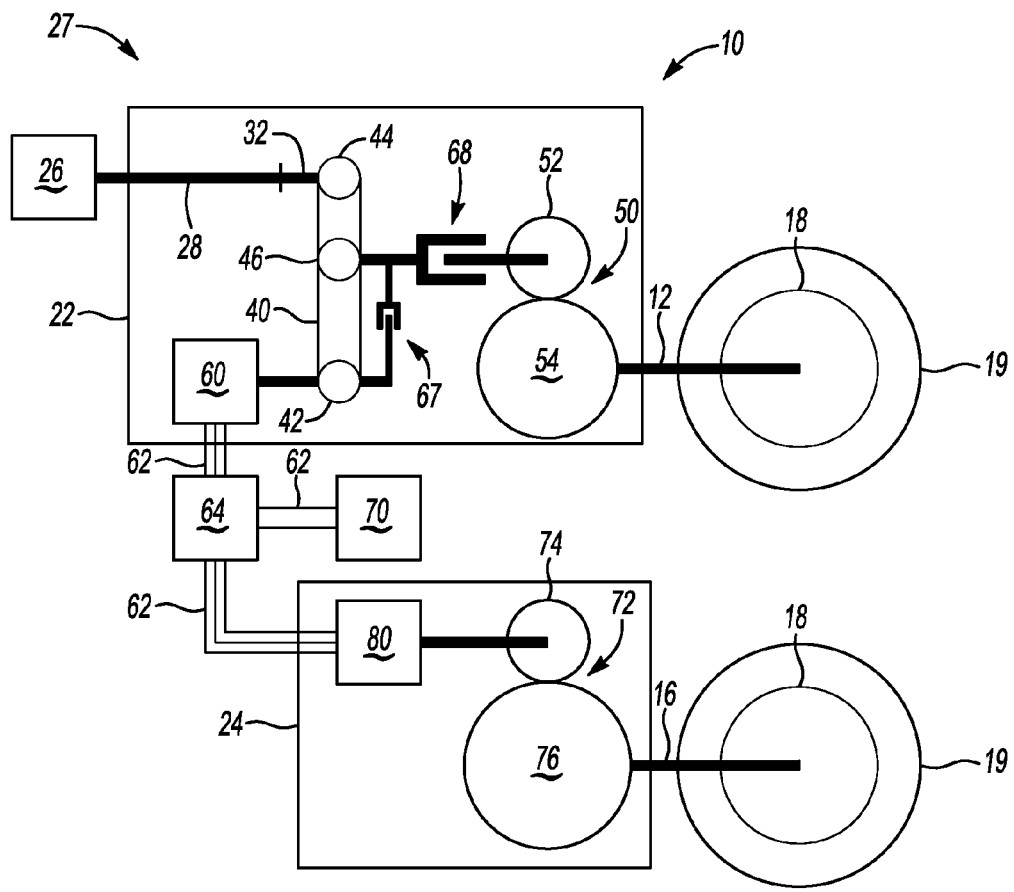
FIG. 2 is a schematic illustration in lever diagram form of the hybrid electric powertrain of FIG. 1.
Figure 3:
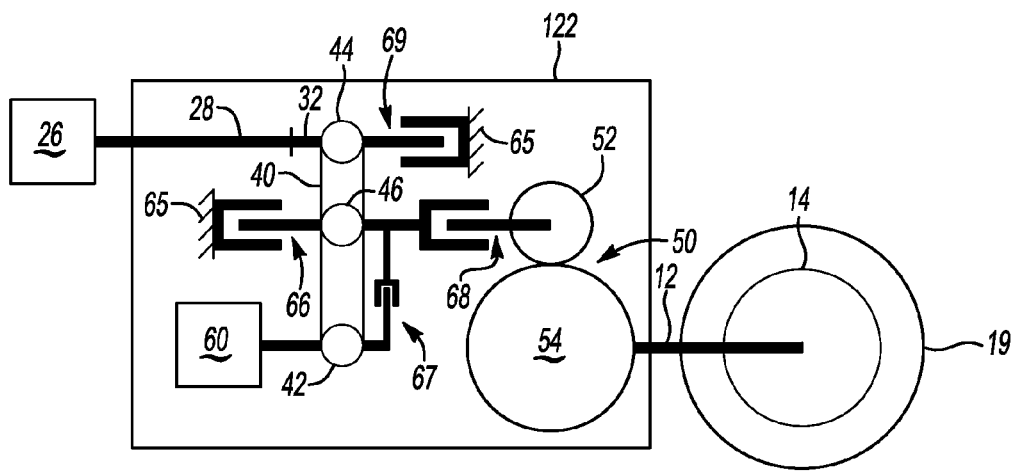
FIG. 3 is a schematic illustration in lever diagram of an alternative embodiment of an engine, transmission and first axle of FIG. 1.

The motor-generator 60 can be used to start the engine 26 in the embodiment of FIG. 2 when the clutch 67 is engaged and the clutch 68 is not engaged. Similarly, the motor-generator 60 can be controlled to operate as a motor to start the engine 26 in the embodiment of FIG. 3 when a brake 66 is engaged to ground the carrier member 46 to a stationary member 65 as shown in FIG. 3. If a starter motor 82 is provided to start the engine 26, then the motor-generator 60 need not be used as a motor to start the engine 26 and may be configured to be operable only as a generator. In such an embodiment, an electric-only, all-wheel drive operating mode would not be available, and the optional input brake 69 of FIG. 3 that holds the engine 26 stationary would not be provided. In an embodiment provided with a dedicated engine starter motor, the brake 66 is not necessary for providing reaction torque for using the motor-generator 60 to start the engine 26, and thus the brake 66 need not be provided. Furthermore, in an embodiment provided with a dedicated engine starter, torque need not be transferred through the planetary gear set 40 when starting the engine, so a clutch 68 is not necessary for disconnecting the planetary gear set 40 from the final drive 50 and need not be provided for that purpose, but would be provided if a hybrid series mode, as discussed herein, is desired. In all of the embodiments described, the vehicle 10 could be driven by the second motor-generator 80 functioning as a motor and receiving electrical power from the battery 70 with the engine 26 stopped in an electric-only operating mode by allowing the first motor-generator 60 to freewheel.

A first fixed torque ratio through the transmission 22 (or transmission 122 of FIG. 3) is provided when clutch 67 is not engaged, clutch 68 is engaged, the first motor-generator 60 is providing torque to keep the planetary gear set 40 in equilibrium, and the second motor-generator 80 is freewheeling. Torque from the first motor-generator 60 may be described to those skilled in the art as providing reaction torque to the torque from the input shaft 32 to convey the torque from the input shaft 32 through the planetary gear set 40 to the final drive 50 and thereby to the first axle 12 when clutch 67 is not engaged. A second fixed torque ratio through the transmission 22 (or the transmission 122 of FIG. 3) is provided when clutch 67 is engaged and clutch 68 is engaged. Torque from the first-motor generator 60 is not required to keep the planetary gear set in equilibrium with clutch 67 engaged, so the second fixed torque ratio is defined without torque from the motor-generator 60 and with the second motor-generator 80 also freewheeling. As desired herein, the second fixed torque ratio has a lower numerical value than the first fixed toque ratio. In one illustrative example, the first torque ratio is 3:1 and the second torque ratio is 2:1. That is, theoretically, according to the ratios of the gears and not including the unintended friction in the transmission 22, the torque on the first axle 12 is three times the torque from the input shaft 32 with the lock-up clutch 67 not engaged, and the torque on the first axle 12 is two times the torque from the input shaft 32 with the lock-up clutch 67 engaged, in this illustrative example. The step ratio between the first fixed torque ratio and the second fixed torque ratio is 1.5. This step ratio is suitable for comfortably shifting between the two fixed torque ratios, and is within the range of step ratios of multi-speed transmissions on contemporary vehicles, which is generally between 1.1 and 2.0.

FIG. 2 depicts a portion of the hybrid vehicle 10 in schematic form, including the hybrid transmission 22 and the electric drive module 24. The transmission 22 is connected to the engine 26 and to the first axle 12. The planetary gear set 40 is depicted as a lever to show the torque and speed relationships among the sun gear member 42, the planet carrier member 46, and the ring gear member 44. The first final drive 50 is depicted as a pair of circles, indicating meshing gears or an arrangement with similar function, to show torque multiplication and speed reduction effected by the final drive 50 from the ring gear member 44 to the first axle 12. The electric drive module 24 is depicted with a pair of circles to show torque multiplication and speed reduction from the motor-generator 80 to the axle 16 through the second final drive 72.

In the embodiment of the hybrid transmission 22 of FIG. 2, the engine 26 is connected to rotate in unison with the ring gear member 44, the motor-generator 60 is connected to rotate in unison with the sun gear member 42, the rotating clutch 68 is operatively connected to the carrier member 46, and the rotating clutch 67 is operatively connected to the sun gear member 42 and the carrier member 46. If the rotor portion of the motor-generator 60 is stationary, the rotating clutch 67 is not engaged, and the rotating clutch 68 is engaged, then the speed ratio from the engine 26 to the first axle 12 is equal to the speed of the ring gear member 44 divided by the speed of the carrier member 46 and multiplied by the gear ratio of the final drive 50, which is the number of teeth of second gear 54 divided by the number of teeth of the first gear 52. If the ratio of the number of teeth of the ring gear member 44 divided by the number of teeth of the sun gear member 42 is R, then the speed ratio through the planetary gear set 40 in this case is (R+1)/R. R is always greater than one, so the speed ratio through the planetary gear set 40 with the sun gear member 42 stationary and the rotating clutch 67 not engaged is always greater than one. This is referred to as "underdrive", since the speed of the output of the planetary gear set 40 (i.e., the carrier member 46) to the final drive 50 is less than the speed of the input to the planetary gear set 40 from the engine 26 (i.e., the speed of the ring gear member 44). Speed is reduced with the sun gear 42 stationary and torque is multiplied through the planetary gear set 40 from the ring gear 44 input to the carrier 46 output when the clutch 67 is not engaged. When the rotating clutch 67 is engaged, the speed ratio through the planetary gear set 40 is one, and may be referred to as "direct drive". Because the planetary gear set 40 provides an underdrive ratio from the engine 26 to the first axle 12, and the transmission 22 provides the lock-up clutch 67 for a direct drive ratio, the motor-generator 60 can be controlled to operate as a generator to provide continuously variable speed ratio through the transmission 22 from vehicle launch nearly to the ratio with the sun gear 42 stationary, and after the clutch 67 is engaged, the transmission 22 can provide a ratio beyond the ratio with the sun gear 42 stationary without circulating power, that is without requiring a second motor-generator 80 to act as a generator to supply electrical power to the first motor-generator 60. The motor-generator 60 can be controlled to have only a negative speed (i.e., controlled to rotate only in a direction opposite the direction of rotation of the input member 32) without using battery power or a zero or positive speed of the sun gear member 42 can be established with the motor-generator 60 using battery power. The speed of the carrier member 46 can thus be increased to positive values if the motor-generator 60 need not obtain power from the motor-generator 80 to do so, that is, if battery power is available and the controller 64 determines according to a stored algorithm that it would be efficiently used in this way.

The torque ratio of the hybrid transmission 22, that is the torque of the axle 12 over the torque on the input shaft 32, is the same as the speed ratio of the hybrid transmission 22, with the sun gear member 42 stationary and the rotating clutch 68 engaged. By measurement, the actual torque of the first axle 12 will be slightly less than the value indicated by the combination of this torque ratio and the torque from the engine 26 because of unavoidable friction and viscous losses within the hybrid transmission 22. Besides these incidental drag losses, the torque ratio of the hybrid transmission 22, that is the torque of the first axle 12 over the torque of input shaft 32 without clutch 67 engaged, is a constant, that is, a single value, based on the numbers of teeth of the gears of the planetary gear set 40 and the numbers of teeth of the gears or ratio of sprockets of the final drive 50. The single constant value also referred to as a single fixed value of the torque ratio is not dependent on the speed of the motor-generator 60, although motor-generator 60 must supply torque to the planetary gear set 40 to keep it in equilibrium with respect to torque when torque is applied to the input shaft 32. In contrast, the speed ratio of the hybrid transmission 22, that is the speed of the input shaft 32, or the engine output shaft 28, over speed of the first axle 12, is continuously variable, based on the speed of the motor-generator 60 and the sun gear member 42. The speeds of input shaft 32, the first axle 12, and the motor generator 60 are a linear combination of one another, based on the numbers of teeth of the gears of the planetary gear set 40 and the gears or sprockets of the final drive 50, provided that clutch 68 is engaged.

The combination of the planetary gear ratio and the final drive gear ratio in the transmission 22 may be selected to allow the engine 26 to be operated without restricting the flow of air or air-fuel mixture into a predetermined number of cylinders 90 of the engine 26 near the minimum speed necessary for continuous engine operation when the vehicle 10 is cruising at a steady speed. As used herein, "the minimum speed necessary for continuous engine operation" is the minimum engine speed at which a predetermined smoothness and consistency in engine output torque for propulsion of the vehicle 10 is achieved with a particular number of cylinders 90 firing and a particular setting of the throttle, if present, and fuel controls. For example, the torque from the damper 30 that is applied to the input shaft 32 in the transmission 22 may be required to remain within 20 percent of a predetermined level of torque or of an average torque level as the input shaft 32 rotates. This minimum speed is determined by a large number of factors which may include the displacement volume of each cylinder 90, the peak pressure attained in each cylinder 90, the reciprocating inertia of the engine 26, the rotating inertia of the engine 26, and the rotating inertia and the spring stiffness of the damper 30. The output torque of the engine 26 is determined in part by peak pressure attained in each cylinder 90, so this minimum speed may increase somewhat with increasing engine torque. This minimum speed may also depend on a minimum fundamental firing frequency, so that the minimum speed may be higher with fewer cylinders in unrestricted operation.

In one non-limiting example, the planetary gear ratio and the final drive gear ratio may be selected so that the engine 26 can be operated at the minimum engine speed for continuous engine operation without throttling, with the vehicle cruising at a steady speed. That is, the torque ratio of torque of the front axle 12 over torque of the input shaft 32 may be selected in the design of the transmission 22 so that the engine 26 may run without throttling over a wide range of steady cruising speeds of the hybrid electric vehicle 10, the lowest speed corresponding to the minimum speed for operating the engine 26 continuously without throttling and with the clutches 67 and 68 engaged. At speeds above this lowest speed, the engine 26 may also be operating without throttling and supplying torque to the front axle 12 at the same torque ratio, but greater torque on the wheels 14, 16, may be required to drive the vehicle 10, torque which may be supplied by the motor-generator 60 and/or by the electric drive module 24 with its motor-generator 80 acting as a motor, as discussed further below.

As used herein, "without throttling" and "unthrottled" mean, in the case of an engine, such as an ordinary spark-ignition engine that uses a throttle for control of its torque output, operation with the throttle in a fully-opened position, also known as "wide-open throttle" operation. A compression-ignition engine does not have a throttle but can use control of the fuel alone to control its torque output. Accordingly, with respect to a compression-ignition engine, the terms "without throttling" and "unthrottled" refer to operation of the compression-ignition engine whether fuel is controlled for maximum torque or any other torque output. The terms "without restriction" and "unrestricted" are herein to be applicable both to operation of a spark-ignition engine without throttling and to operation of a compression-ignition engine with a predetermined maximum amount of fuel that can be burned in the cylinders or other working chambers which are being operated without producing excessive amounts of smoke or other unburned fuel.

The fixed second torque ratio of the hybrid transmission 22, established by the planetary gear set 40 and the final drive 50 with the clutches 67 and 68 engaged, the torque that the engine 26 develops without throttling, and the road load developed by the vehicle 10 as a function of its speed determine the vehicle cruising speed at which the hybrid transmission 22 will drive the vehicle with both the motor-generator 60 and the electric drive module 24 freewheeling. If this ratio is high, then this speed will be high; if this ratio is low, then this speed will be low, because the road load increases as the speed of the vehicle 10 increases while the torque available from the engine 26 at any particular speed remains relatively constant as the speed of the engine 26 increases. When clutches 67 and 68 are engaged, the second, lower torque ratio is established that allows the vehicle 10 to cruise with the engine 26 in continuous operation without throttling and the motor-generator 60 and the electric drive module 24 either freewheeling or providing propulsion across a customary range or wide range of vehicle speeds. For example, with only the hybrid transmission 22 driving the vehicle and the engine 26 at wide open throttle, the vehicle 10 may cruise at a moderate speed (e.g., 100 kilometers per hour (kph)), but with the electric drive module 24 also providing propulsion, the vehicle 10 may cruise much faster (e.g. 160 kph) as a maximum vehicle speed.

With clutches 67 and 68 engaged, the vehicle 10 may be equipped to alternately cruise at lower vehicle speeds with the engine 26 in continuous operation without throttling and the motor-generator 60 acting as a generator to produce electric power to charge the energy storage device 70, provided that the engine speed does not fall below the minimum engine speed for continuous operation. For example, with only the hybrid transmission 22 driving the vehicle and the engine 26 at wide open throttle, the vehicle 10 may cruise at a low speed (e.g. 60 kph) while using the motor-generator 60 to charge the energy storage device 70, because the torque from the engine 26 exceeds that necessary to overcome the road load of the vehicle 10 at low speed.

In one embodiment, the engine 26 is equipped to operate and to deliver torque to its output shaft 28 with a predetermined number of its cylinders 90 firing, and the rest of its cylinders 90 deactivated, between a predetermined minimum speed of the engine output shaft 28 for such operation and a predetermined maximum engine speed. The second fixed torque ratio, with the clutches 67 and 68 engaged, is fixed and determined by the single mechanical ratio (e.g. gear ratio or sprocket ratio) of the final drive 50 of the hybrid transmission 22. The second torque ratio allows the engine 26 to operate at wide open throttle with some of its cylinders 90 deactivated with the vehicle 10 cruising at a steady speed and the motor-generators 60 and 80 freewheeling. That is, the torque output of the engine 26 at wide open throttle with a predetermined number of its cylinders 90 deactivated, when multiplied by the second torque ratio through the transmission 22 and applied to the axle 12 is just sufficient to overcome the road load of the vehicle 10 while traversing a flat and level road at a steady speed. If torque is applied by either of the motor-generators 60 or 80 instead, then the vehicle 10 will settle at a faster or slower steady speed with a proportional engine speed: faster with motoring torque; slower with generating torque. In an embodiment, the cruising speed of the vehicle 10 with the second torque ratio, the engine 26 at wide open throttle with a predetermined number of cylinders firing, and the motor-generators 60 and 80 freewheeling causes the engine 26 to operate near its minimum speed for operation at wide open throttle with the predetermined number of cylinders firing.

In one illustrative example of this embodiment, the engine 26 may be equipped to operate on two of its four cylinders 90 between a speed of 1800 revolutions per minute (rpm) at wide open throttle operating with two cylinders deactivated and a speed of 6000 rpm as measured at the engine output shaft 28. The second torque ratio of the hybrid transmission 22 in this example is equal to the mechanical ratio of the final drive 50. The final drive 50 is composed of two gears 52 and 54, with the gear 54 having twice as many teeth on it as the gear 52, establishing a gear ratio of 2.0 and, with the action of the engaged clutches 67 and 68, a second torque ratio of 2.0 through the transmission 22. The torque output of the engine 26 at wide open throttle with 2 cylinders deactivated varies somewhat with engine speed, but not as sharply as the road load of the vehicle 10 varies with vehicle speed and therefore the rotational speed of the axle 12. Thus, an equilibrium is reached with the second torque ratio at a particular combination of engine speed and vehicle speed, 2000 rpm and 100 kph, respectively, in this non-limiting example, with the motor-generators 60 and 80 freewheeling. If the motor-generator 60 supplies motoring torque, instead, using power from the energy storage device 70, then a new equilibrium is established and the engine speed and vehicle speed increase to 2200 rpm and 110 kph. If the motor-generator 60 applies generating torque, instead, supplying power to the energy storage device 70, then the engine speed and vehicle speed decrease to 1800 rpm and 90 kph.

In this illustrative example of an embodiment, the engine 26 may alternately fire all four of its cylinders with the second torque ratio through the hybrid transmission 22, established with clutches 67 and 68 engaged and the first motor-generator 60 freewheeling, while the second motor-generator 80 is also freewheeling. The engine 26 can deliver approximately twice as much torque to the input shaft 32 with all four cylinders firing as with only two cylinders firing, so the torque developed at the axle 12 with four cylinders firing is sufficient at wide open throttle to reach a cruising speed that is substantially higher than with two cylinders, 150 kph, for example, with the engine 26 at a proportionally higher speed, such as 2800 rpm. Furthermore, the minimum speed for engine operation with four cylinders firing may be lower, 1000 rpm, for instance, so that by throttling the engine 26 (or otherwise restricting its output), a wide range of vehicle cruising speeds may be reached with the second torque ratio, from 50 kph to 150 kph, for instance.

FIG. 3 shows an alternative arrangement of a hybrid transmission 122 in schematic form. The engine 26 is connected for unitary rotation with the ring gear member 44, the motor-generator 60 is connected for unitary rotation with the sun gear member 42, the rotating first clutch 67 is engageable to establish unitary rotation of the sun gear member 42 and the carrier member 46, and the rotating second clutch 68 and a first brake 66 are operatively connected to the planet carrier member 46. The first brake 66 is selectively engageable to ground the carrier member 46 to the stationary member 65. An input brake 69 is selectively engageable to connect the ring gear member 44 to the stationary member 65, thereby holding the ring gear member 44 and the input shaft 32 stationary. If the rotor of the motor-generator 60 is stationary, the clutch 67 is not engaged, and the rotating clutch 68 is engaged, then the speed ratio of the transmission 122, i.e., the ratio of the speed of the input shaft 32 to the speed of the first axle 12, is equal to the speed of the ring gear member 44 divided by the speed of the planet carrier member 46 multiplied by the gear ratio of the final drive 50, which is the number of teeth of gear member 54 divided by the number of teeth of the gear member 52. If the ratio of the number of teeth on the ring gear member 44 divided by the number of teeth on the sun gear member 42 is R, then the speed ratio through the planetary gear set 40 in the hybrid transmission 122 is (R+1)/

R. R is always greater than one, so the speed ratio through the planetary gear set 40 with the sun gear member 42 stationary is always greater than one. The torque ratio of the transmission 122 is a constant value with clutch 68 engaged and clutch 67 not engaged, regardless of the speed of the engine 26, the speed of the motor-generator 60, or the speed of the first axle 12. The torque ratio of the transmission 122 is a constant value equal to the speed ratio of the transmission with the motor-generator 60 stationary. By contrast, the speed ratio of the transmission 122 is not constant, but is instead continuously variable by changing the speed of the motor-generator 60.

In one embodiment, by way of non-limiting example, the torque ratio of the first axle 12 to the input member 32 in the transmission 122 (i.e., with clutch 67 engaged and clutch 68 engaged, the final drive gear ratio) may be chosen during the design of the transmission to allow the engine 26 to be operated at a speed at or very near the minimum speed necessary for continuous efficient engine operation, i.e., the minimum speed described above, when the vehicle 10 is cruising at a steady speed. For example, the planetary gear ratio and the final drive gear ratio may be selected so that the engine 26 can be operated at the minimum engine speed for continuous engine operation along a predetermined wide open throttle torque curve associated with the engine 26 operating on a predetermined number of firing cylinders with the vehicle 10 cruising at a steady speed.

The combination of the gear ratio of the planetary gear set 40, that is, the relative numbers of teeth on the ring gear member 44 and the sun gear member 42, and the gear ratio of the first final drive 50 in the transmission 22 or 122 has a particular relationship with the engine 26 and the vehicle 10. The range of engine operating speeds is from the minimum speed for continuous engine operation to a maximum engine speed. If the engine 26 is an internal combustion engine with spark-ignition and configured for cylinder deactivation, or if the engine 26 is a compression-ignition engine, such as a diesel engine, operation of some or all of the cylinders 90 of the engine 26 without throttling may be at a lesser torque than the maximum that is available from the engine 26, in order to allow a greater torque ratio through the transmission 22 or 122.

Designing the transmission 22 or 122 so that the engine 26 can be operated without throttling with clutches 67 and 68 engaged may be advantageous. Operating the engine 26 "without throttling" means without partially restricting the flow of air or an air-fuel mixture to some or all of those working chambers of the engine 26 that are not deactivated if cylinder deactivation is available. Such a choice of torque ratio (i.e., the torque of the first axle 12 to the torque of the input member 32 when clutches 67 and 68 are engaged and the motor-generator 60 is stationary) eliminates the need to supply power to the motor-generator 60 during cruising, power that would need to come either from the energy storage device 70, and would therefore eventually be exhausted, or from the motor-generator 80 in the electric drive module 24, which would cause the second axle 16 to act in opposition to the forward motion of the vehicle 10. Instead, in the transmission 22 or 122, the motor-generator 80 in the electric drive module 24 can act as a motor to help maintain the motion of the vehicle 10, to add torque when the vehicle is accelerating with the clutches 67 and 68 engaged, or can coast (with the rotor of the motor-generator 80 freewheeling) without having any substantial influence on the motion of the vehicle 10.

The motor-generator 60 acts as a "self-powered brake" when it is acting as a generator with a very low rotational speed of its rotor, but is neither producing net electrical output or requiring net electrical input, that is, when the motor-generator 60 produces just enough electrical power to prevent its own rotation. If the motor-generator 60 is not used to start the engine 26, that is, if the engine 26 is equipped with its own starter motor, such as optional starter motor 82 shown in dashed lines in FIG. 1, then the motor-generator 60 would not necessarily need to be equipped to operate as a motor under any vehicle operating conditions, and could in fact be configured to be operable only as a generator. This could allow a simplified construction of the controller 64, because a controller with a set of controlled switches is typically used to operate a contemporary motor-generator as a motor, but an electric machine that is capable only of generation (i.e., a generator rather than a motor-generator) needs only rectifier diodes to convert alternating current into direct current, which may be less costly and complex than to include switches such as power transistors that must actively interrupt the flow of direct current to produce alternating current.

If the energy storage device 70 reaches a predetermined maximum state of charge with the engine 26 on and the clutches 67, 68 engaged, the controller 64 can shut off the engine 26, disengage the clutch 68, and control the motor-generator 80 to function as a motor, discharging the energy storage device 70, and propelling the vehicle 10. As used herein, the engine 26 is "off" when no fuel is supplied for combustion in the engine 26. The engine output shaft 28 can still be rotating when the engine 26 is off. When the energy storage device 70 reaches a predetermined minimum state of charge, the controller 64 will control the motor-generator 60 to function as a motor with clutch 67 engaged to start the engine 26, and will then engage the clutch 68, so that the engine 26 will again propel the vehicle 10, with the motor-generator 60 again controlled by the controller 64 to function as a generator so that the required speed ratio of the transmission 22 or 122 will be provided. That is, during vehicle cruising at low vehicle speeds, the engine 26 will run intermittently.

In the transmission 122 of FIG. 3, the brake 66 will be engaged when the motor-generator 60 is controlled to operate as a motor to start the engine 26. Brake 69 and clutches 67 and 68 are disengaged while the motor-generator 60 is starting the engine 26. The brake 66 is disengaged when the engine 26 is started. Disengagement of the brake 66 and engagement of the clutch 68 can be synchronous, allowing the brake 68 and clutch 66 to be dog clutches, although they may instead be plate clutches.

Because the fixed second ratio of torque (and corresponding fixed speed ratio) is available via engagement of the first clutch 67, operation in the input-split operating mode (i.e., when clutch 67 is not engaged) can be limited to operating conditions where the correct speed ratio of the speed of the first axle 12 to speed of the engine output shaft 28 at a predetermined engine efficiency is maintained, without the speed of the engine 26 going below its minimum speed in the range of engine operating speeds, and without using power from the energy storage device 70. The motor-generator 80 thus need not operate as a generator to provide electrical power to the motor-generator 60 during the input-split mode, and the rear axle 16 will thus not retard the vehicle 10 while it is being driven with torque applied at the first axle 12. This condition of opposing torque is associated with a power loop "through the road", because the motor-generator 80 would need to use torque at the axle 14 (i.e., the torque at the wheels 18 provided by the road) impeding the desired motion of the vehicle 10 to supply torque in order to allow the motor-generator 80 to function as a generator. Optionally, the controller 64 could control the motor-generator 80 to function as a generator, creating this condition of opposing torque when the vehicle 10 is going downhill or slowing down, which are situations where a certain amount of retarding torque may be desirable to maintain the speed of the vehicle 10.

The configuration of the powertrain 27 enables efficient recovery from wheel slip. Specifically, the controller 64 is configured to receive operating parameters indicative of wheel slip, such as by torque sensors placed on the axles 12, 16. In the event of wheel slip at one of the front wheels 14, reflected as an abrupt reduction of torque at the wheel axle 12, the controller 64 can apply torque to the other of the front wheels 14 by generating a braking command signal to cause an appropriate level of engagement of friction brake mechanisms 20 on the slipping one of the front wheels 14. The front motor-generator 60 may provide reaction torque to the planetary gear set 40 to allow the engine 26 to drive the front wheels 14, and act as a generator to supply electrical power to the rear motor-generator 80 for driving the rear wheels 18. Under those conditions, and if both of the front wheels 14 are slipping, then application of both of the front friction brake mechanism 20 can be used to increase the torque upon the front motor-generator 60 and thereby increase the flow of power to the rear motor-generator 80 and the torque supplied for driving the vehicle 10. Alternatively or in addition, the controller 64 can cause electric power to flow from the energy storage device 70 to the motor-generator 80, and control the motor-generator 80 to function as a motor to thereby apply additional torque at the rear axle 16, aiding in recovery of traction by the vehicle 10. Still further, in addition to the above slip recovery actions, or in the alternative to the above actions, the controller 64 can cause disengagement of the clutch 68, while controlling the motor-generator 60 to function as a generator, sending electric power to the motor-generator 80, which is controlled to function as a motor. In this manner, torque is removed from the slipping wheels 14 and axle 12, and applied to the axle 16.

Similarly, if the controller 64 determines that either or both of wheels 18 are slipping, the controller 64 is configured to undertake slip recovery actions that aid in the recovery of traction of the vehicle 10. For example, the controller 64 can direct electric power generated by the motor-generator 60 to the energy storage device 70, instead of to the motor-generator 80, to lessen torque applied at the wheels 18. Alternatively or in addition, the controller 64 can apply torque to the wheels 14 and/or 18 by generating a braking command signal to cause an appropriate level of engagement of friction brake mechanisms 20 on the wheels 14 and/or 18. Torque applied to the wheels 14 and thereby to axle 12 by selective engagement of the friction brake mechanisms 20 can prevent slipping of the wheels 14 while momentarily maintaining the torque from the engine 26 and torque on the motor-generator 60 and power output from the motor-generator 60.

The vehicle 10 with the hybrid powertrain 27 and with either of the hybrid electric transmissions 22, 122 is operable in a hybrid series state or operating mode. This mode is established in the transmission 22 when the controller 64 controls the first motor-generator 60 to operate as a generator with the engine 26 on, and the second motor-generator 80 to operate as a motor. The controller 64 also controls the clutch 67 to be engaged but does not engage the second clutch 68. This establishes a hybrid series operating mode, with tractive torque provided at the wheels 18. The transmission 122 is operable in the same manner, with the brakes 66 and 69 also not engaged. The motor-generator 80 can be controlled to provide propulsion in the reverse direction, if desired, providing engine-on reverse in the hybrid series operating mode.

The vehicle 10 with the hybrid powertrain 27 and with either of the hybrid transmissions 22, 122 is also operable in a first axle-drive, one-motor, electric-only state or operating mode when the engine 26 is off, the second motor-generator 80 is off (i.e., not powered), and the controller 64 controls the first motor-generator 60 to operate as a motor. In the transmission 22, the controller 64 would control the clutches 67 and 68 to be engaged and the engine 26 would spin in unison with the first motor-generator 60 without firing, remaining off. In the transmission 122, the controller 64 would control the brake 69 and the clutch 68 to be engaged, and the brake 66 and the clutch 67 would be disengaged.

The vehicle 10 with the hybrid powertrain 27 and with either of the hybrid transmissions 22, 122 is also operable in a second axle-drive, one-motor, electric-only operating mode when the engine 26 is off, the first motor-generator 60 is off, and the controller 64 controls the second motor-generator 80 to operate as a motor, applying torque to the second axle 16 and wheels 18.

The vehicle 10 with the hybrid powertrain 27 and with either of the transmission 22 or 122 is also operable in a two axle-drive, two-motor electric-only operating mode with the engine 26 off. In the transmission 22, the clutches 67 and 68 are engaged. In the transmission 122, the brake 69 and the clutch 68 are engaged. The motor-generators 60, 80 are controlled to function as motors.

A neutral state or operating mode is provided in the vehicle 10 with the hybrid powertrain 27 and with either of the transmissions 22, 122 when neither of the clutches 67, 68 are engaged, such as when transitioning between the input-split operating mode and the series operating mode. The motor-generator 80 is still operatively connected to the rear axle 16 in the neutral operating mode, and can be controlled as a motor to add torque at the rear axle 16 when the transmission 22 or 122 is in the neutral state.

In summary, the powertrain 27 with either of the transmissions 22, 122 and the powertrain 227 have the four clutch engagement states listed in Table 1 in common. The transmission 122 can also utilizes the brakes 66, 69 in some of these states as described above.

TABLE 1

| STATE | CLUTCH 67 | CLUTCH 68 | TYPICAL USE |
|---|---|---|---|
| Input-Split | OFF | ON | Acceleration |
| Fixed Gear | ON | ON | Cruising |
| Series | ON | OFF | Electric-Only and Engine Start/Stop |
| Neutral (Electric Transmission) | OFF | OFF | Transition Between Input-Split and Series |

Figure 4:
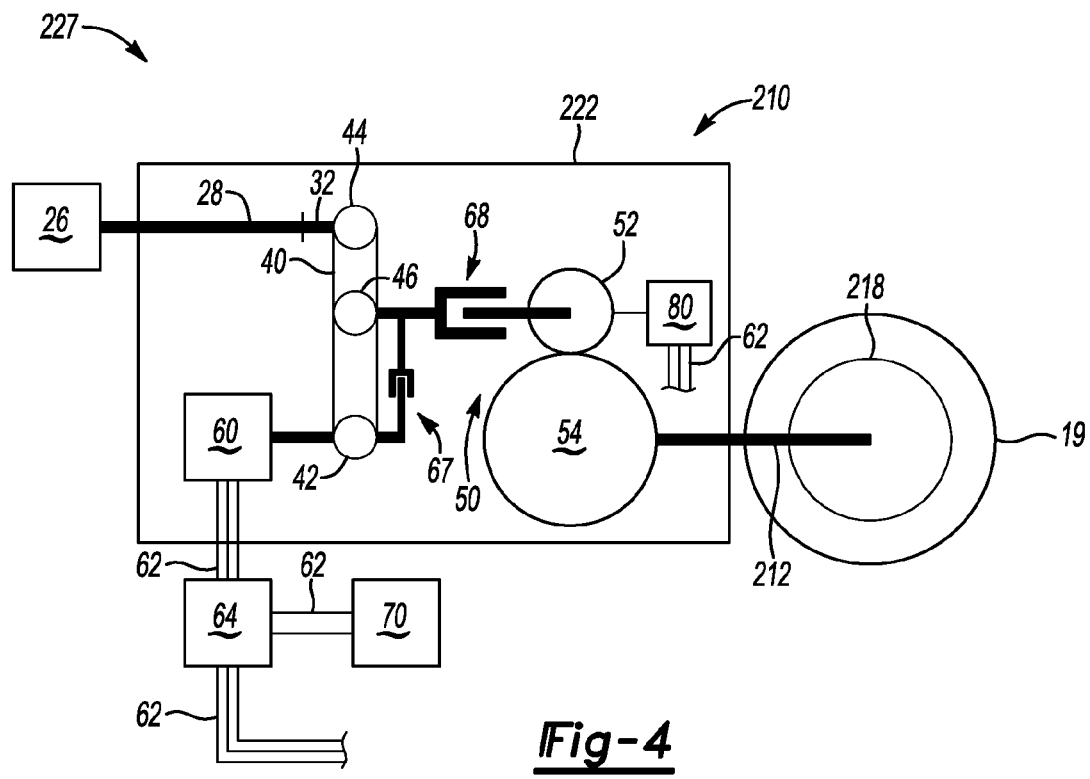
FIG. 4 is a schematic illustration in of an alternative embodiment of a vehicle having an alternative hybrid electric powertrain shown in lever diagram form.

FIG. 4 illustrates an alternative embodiment of a vehicle 210 that includes a hybrid powertrain 227 and hybrid electric transmission 222 having many of the same components, indicated with identical references numbers, as the hybrid powertrain 27 and hybrid electric transmission 22. The hybrid powertrain 227 is a single drive unit that powers only one axle 212 of the vehicle 210. The axle 212 can be either a front axle or a rear axle having wheels 218, only one of which is shown, with a second axle (not shown) of the vehicle 210 unpowered. The hybrid powertrain 227 has the second motor-generator 80 drivingly connected to the first member 52 of the final drive 50 and downstream in powerflow from the carrier member 46 relative to the clutch 68. The cables 62 connecting the controller 64 with the motor-generator 80 are fragmented for purposes of clarity in the drawing. The hybrid powertrain 227 is operable in each of the four states or operating modes shown in Table 1. As described with respect to the powertrains 27 and 127, the clutches 67 and 68 can be in the hybrid series state (clutch 67 engaged and clutch 68 disengaged) during an electric-only operating mode in which the motor-generator 80 operates as a motor using energy from the energy storage device 70 while the motor-generator 60 freewheels. Although clutch 67 need not necessarily be engaged in order for the motor-generator 80 to provide tractive torque in the electric-only operating mode, if the clutch 67 is engaged, the controller 64 can quickly control the motor-generator 60 to restart the engine 26 and then engage clutch 68 as well to transition to the input-split state if the state of charge of the energy storage device 70 falls to a predetermined minimum state of charge.

Accordingly, based on the above descriptions of the vehicle 10, 210 and transmissions 22, 122, 222, a method of operating a hybrid vehicle 10 includes operating an engine 26 that is connected for unitary rotation to a first member (i.e., ring gear member 44) of a planetary gear set 40, and controlling (via controller 64) a first motor-generator 60 connected for unitary rotation with a third member (i.e., sun gear member 42) of the planetary gear set 40, and with a first axle 12 or 212 of the vehicle 10 driven through a final drive 50 operatively connectable with a second member (i.e., carrier member 46) of the planetary gear set 40, to establish a first ratio of torque of the first axle 12 or 212 to torque of the engine 26 when the first motor-generator 60 and thus the sun gear member 42 is stationary with mechanical torque applied by the first motor-generator 60. The method includes engaging, via the controller 64, a first clutch 67 that connects the third member (i.e., sun gear member 42) for unitary rotation with the second member (i.e., carrier member 46), thereby establishing a second ratio of torque of the first axle 12 or 212 to torque of the engine 26 that is numerically lower than the first ratio without throttling and without engine torque exceeding a torque necessary to propel the vehicle 10 or 210 at a steady vehicle speed. When the first clutch 67 is not engaged, and the second clutch 68 is engaged, the engine 26 is on and the motor-generator 60 operates as a motor or as a generator, an input-split operating mode is established. When the clutches 67 and 68 are engaged, the engine 26 is on, and the motor-generator 60 is operated as a motor or as a generator, a hybrid parallel operating mode is established.

The method further includes disengaging a second clutch 68 that connects the second member (i.e., carrier member 46) for unitary rotation with a first member 52 of the final drive, and controlling the first motor-generator 60 to function as a motor to start the engine 26. The clutch 67 can be engaged when the motor-generator 60 starts the engine 26 or, in the transmission 122, the brake 66 can instead be engaged. The method includes disengaging a second clutch 68 that connects the second member (i.e., carrier member 46) for unitary rotation with a member 52 of the first final drive 50. The method can include controlling the first motor-generator 60 to operate as a generator to provide electrical power to a second motor-generator 80, and controlling the second motor-generator 80 to function as a motor to drive either a second axle 16 of the vehicle 10 through a second final drive 72 (or the axle 212 of the vehicle 210 through final drive 50) operatively connecting the second motor-generator 80 and the second axle 16 (or the axle 212) in a hybrid series operating mode. Additionally, the method can include engaging a second clutch 68 that connects the second member (i.e., the carrier member 46) for unitary rotation with the first member 52 of the first final drive 50 while the first clutch 67 remains engaged. The method also can include then controlling the first motor-generator 60 and the second motor-generator 80 to operate as motors to provide a two axle-drive, two motor electric-only operating mode.

While the best modes for carrying out the invention have been described in detail, those familiar with the art to which this invention relates will recognize various alternative designs and embodiments for practicing the invention within the scope of the appended claims.

The invention claimed is:

1. A hybrid vehicle having a first axle and a second axle and comprising:
    an engine;
    a first motor-generator;
    a second motor-generator electrically connected to the first motor-generator through a power inverter and an energy storage device; wherein the second motor-generator is connected for proportional rotation with one of the axles;
    a transmission that includes:
        a planetary gear set having a first member, a second member, and a third member, including a sun gear member, a ring gear member, and a carrier member that supports a plurality of pinion gears that mesh with the sun gear member and the ring gear member; wherein the engine is connected for unitary rotation with the first member of the planetary gear set; wherein the first motor-generator is connected for unitary rotation with the third member of the planetary gear set;
        a first final drive having a first member and a second member; wherein the first member of the first final drive is operatively connectable to rotate in unison with the second member of the planetary gear set, and the second member of the first final drive is driven by the first member of the first final drive and is connected for unitary rotation with the first axle;
        a first clutch selectively engageable to connect any two of the members of the planetary gear set for unitary rotation with one another; the planetary gear set providing an underdrive ratio of speed of the second member of the planetary gear set to speed of the engine when the first motor-generator is stationary and the first clutch is not engaged; and
    the hybrid vehicle having a first ratio of torque of the first axle to torque of the engine when the first clutch is not engaged, and the first motor-generator is powered to apply torque on the third member of the planetary gear set, and a second ratio of torque of the first axle to torque of the engine lower than the first ratio when the first clutch is engaged and neither of the first and the second motor-generators is powered, the hybrid vehicle being operable in a power-split operating mode when the first clutch is not engaged and in a parallel operating mode when the first clutch is engaged.

2. The hybrid vehicle of claim 1, wherein the second ratio of torque is that at which the engine operates without throttling, without torque from the engine exceeding a torque necessary to propel the vehicle at a steady vehicle speed, and with the second motor-generator unpowered.

3. The hybrid vehicle of claim 1, wherein the first clutch is engageable to connect the second member of the planetary gear set for unitary rotation with the third member of the planetary gear set, and further comprising:
    a second clutch selectively engageable to connect the second member of the planetary gear set for unitary rotation with the first member of the first final drive; and wherein the first motor-generator is operable as a motor to start the engine when the second clutch is disengaged and the first clutch is engaged.

4. The hybrid vehicle of claim 3, wherein the first motor-generator is operable as a generator and the second motor-generator is operable as a motor with the engine on, the first clutch engaged, and the second clutch not engaged in a hybrid series operating mode.

5. The hybrid vehicle of claim 3, further comprising:
a brake selectively engageable to ground the second member of the planetary gear set to a stationary member; and
wherein the first motor-generator is operable as a motor to start the engine when the second clutch is disengaged, the brake is engaged, and the first clutch is disengaged.

6. The hybrid vehicle of claim 3, wherein the vehicle is operable in a first axle-drive, one-motor, electric-only operating mode when the engine is off, the first and second clutches are engaged, the second motor-generator is unpowered and the first motor-generator is operated as a motor.

7. The hybrid vehicle of claim 6, further comprising:
a second final drive having a first member and a second member; wherein the first member of the second final drive is operatively connected for unitary rotation with the second motor-generator, and the second member of the second final drive is driven by the first member of the second final drive and is connected for unitary rotation with the second axle; and
wherein the vehicle is operable in a two axle-drive, two motor electric-only operating mode when the engine is off, the first and second clutches are engaged, and the first motor-generator and the second motor-generator are operated as motors.

8. The hybrid vehicle of claim 3, further comprising:
a brake selectively engageable to ground the first member of the planetary gear set to a stationary member; and
wherein the vehicle is operable in a one-motor electric-only operating mode when the brake is engaged, the first clutch is disengaged, the second clutch is engaged, the second motor-generator is unpowered and the first motor-generator is operated as a motor.

9. The hybrid vehicle of claim 3, further comprising:
a second final drive having a first member and a second member; wherein the first member of the second final drive is operatively connected for unitary rotation with the second motor-generator, and the second member of the second final drive is driven by the first member of the second final drive and is connected for unitary rotation with the second axle; wherein the second motor-generator is operable as a motor to provide tractive torque when accelerating the vehicle with the first clutch engaged and the second clutch disengaged.

10. The hybrid vehicle of claim 1, and further comprising:
a second final drive having a first member and a second member; wherein the first member of the second final drive is operatively connected for unitary rotation with the second motor-generator, and the second member of the second final drive is driven by the first member of the second final drive and is connected for unitary rotation with the second axle; and
wherein the hybrid vehicle is operable in a second axle-drive, one-motor, electric-only operating mode when the engine is off, the first motor-generator is unpowered, and the second motor-generator is operated as a motor.

11. The hybrid vehicle of claim 1, wherein the first axle is connected for unitary rotation with at least one first wheel and the second axle is connected for unitary rotation with at least one second wheel, and further comprising:

an electronic controller operatively connected to the motor-generators and the first clutch;
a second final drive having a first member and a second member; wherein the first member of the second final drive is operatively connected for unitary rotation with the second motor-generator, and the second member of the second final drive is driven by the first member of the second final drive and is connected for unitary rotation with the second axle; and
wherein the controller is configured to (i) determine if said at least one first wheel is slipping, and (ii) if said at least one first wheel is slipping, cause additional torque to be provided by at least one of:
applying friction brake mechanisms operatively connected said at least one first wheel; and
directing electric power from the energy storage device to the second motor-generator and controlling the second motor-generator to function as a motor.

12. The hybrid vehicle of claim 11, further comprising:
a second final drive having a first member and a second member; wherein the first member of the second final drive is operatively connected for unitary rotation with the second motor-generator, and the second member of the second final drive is driven by the first member of the second final drive and is connected for unitary rotation with the second axle;
a second clutch selectively engageable to connect the second member of the planetary gear set for unitary rotation with the first member of the first final drive; and
wherein the controller is configured to cause additional torque to be provided to said at least one second wheel if the controller determines that said at least one first wheel is slipping by:
disengaging the second clutch, and controlling the first motor-generator to function as a generator and the second motor-generator to function as a motor receiving electric power from the first motor-generator.

13. A hybrid vehicle having a first axle and a second axle and comprising:
an engine;
a transmission that includes:
a simple planetary gear set having a sun gear member, a ring gear member, and a carrier member that supports a plurality of pinion gears that mesh with the sun gear member and the ring gear member; wherein the engine is connected for unitary rotation with the ring gear member;
a first final drive having a first member and a second member; wherein the first member of the first final drive is operatively connectable to rotate in unison with the carrier member, and the second member of the first final drive is driven by the first member and is connected for unitary rotation with the first axle;
a first motor-generator connected for unitary rotation with the sun gear member;
a first clutch selectively engageable to connect the carrier member for unitary rotation with the sun gear member; the planetary gear set providing an underdrive ratio of speed of the carrier member to speed of the engine when the sun gear member is stationary;
a second clutch selectively engageable to connect the carrier member for unitary rotation with the first member of the first final drive downstream of the first clutch;
a second motor-generator continuously operatively connected with one of the axles;
the hybrid vehicle having:

a first ratio of torque of the first axle to torque of the engine when the first clutch is not engaged, the second clutch is engaged, the first motor-generator is powered to apply torque on the sun gear member, and the second motor-generator is unpowered, and a second ratio of torque of the first axle to torque of the engine lower than the first ratio when the first clutch is engaged and at least one of the first and the second motor-generators is powered; and the hybrid vehicle thereby being operable in a power-split operating mode when the first clutch is not engaged and the second clutch is engaged, and in a parallel hybrid operating mode when both the first clutch and the second clutch are engaged.

14. The hybrid vehicle of claim 13, further comprising:
a second final drive having a first member and a second member; wherein the first member of the second final drive is operatively connected for unitary rotation with the second motor-generator, and the second member of the second final drive is driven by the first member and is connected for unitary rotation with the second axle;

wherein the hybrid vehicle is operable in a second axle-drive, one-motor electric-only operating mode when the first clutch is not engaged, the engine is off, the first motor-generator is not powered, and the second motor-generator is operated as a motor.

15. A method of controlling a hybrid vehicle that has an engine, a first motor-generator, a second motor-generator, a first drive axle, a second drive axle, and a planetary gear set with a first, a second, and a third member, the method comprising:

controlling the first motor-generator via a controller to apply torque on the third member of the planetary gear set; wherein the first motor-generator is connected for unitary rotation with the third member of the planetary gear set; wherein the second motor-generator is operatively connected for proportional rotation with one of the drive axles; wherein the engine is operatively connected for unitary rotation with the first member of the planetary gear set, and the first drive axle is driven through a first final drive operatively connectable with the second member of the planetary gear set, thereby establishing a first ratio of torque of the first drive axle to torque of the engine when a first clutch that connects any two of the members of the planetary gear set for unitary rotation is not engaged; and engaging the first clutch to establish a second ratio of torque of the first drive axle to torque of the engine that is lower than the first ratio.

16. The method of claim 15, further comprising:
controlling the first motor-generator to function as a motor to start the engine while the first clutch is engaged and a second clutch that connects the second member for unitary rotation with a member of the first final drive is disengaged.

17. The method of claim 15, further comprising:
disengaging a second clutch that connects the second member for unitary rotation with a member of the first final drive while the first clutch remains engaged;
controlling the first motor-generator to operate as a generator to provide electrical power to the second motor-generator; and
controlling the second motor-generator to function as a motor to provide tractive torque in a hybrid series operating mode.

18. The method of claim 15, wherein the second motor-generator is operatively connected for proportional rotation with the second drive axle, and further comprising:
engaging a second clutch that connects the second member for unitary rotation with a member of the first final drive while the first clutch remains engaged; and
controlling the first motor-generator and the second motor-generator to operate as motors to provide a two axle-drive, two-motor electric-only operating mode.

* * * * *